United States Patent
Ko et al.

(10) Patent No.: US 9,328,197 B2
(45) Date of Patent: May 3, 2016

(54) POLYCARBONATE HAVING HIGH FLUIDITY AND METHOD OF PREPARING THE SAME

(71) Applicant: LG CHEM, LTD., Seoul (KR)

(72) Inventors: Un Ko, Daejeon (KR); Hyong Min Bahn, Daejeon (KR); Moo Ho Hong, Daejeon (KR); Byoung Kue Chun, Daejeon (KR); Young Young Hwang, Daejeon (KR); Min Jeong Kim, Daejeon (KR); Jung Jun Park, Daejeon (KR); Ki Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/443,941

(22) PCT Filed: Sep. 30, 2014

(86) PCT No.: PCT/KR2014/009229
§ 371 (c)(1),
(2) Date: May 19, 2015

(87) PCT Pub. No.: WO2015/047046
PCT Pub. Date: Apr. 2, 2015

(65) Prior Publication Data
US 2015/0299387 A1    Oct. 22, 2015

(30) Foreign Application Priority Data

Sep. 30, 2013 (KR) .................. 10-2013-0116329
Sep. 30, 2014 (KR) .................. 10-2014-0131381

(51) Int. Cl.
*C08G 63/00* (2006.01)
*C08G 64/16* (2006.01)
*C08G 64/24* (2006.01)
*C08G 64/28* (2006.01)
*C08G 64/06* (2006.01)
*C08G 64/18* (2006.01)
*C08G 63/02* (2006.01)

(52) U.S. Cl.
CPC ............ *C08G 64/1608* (2013.01); *C08G 64/06* (2013.01); *C08G 64/183* (2013.01); *C08G 64/24* (2013.01); *C08G 64/28* (2013.01)

(58) Field of Classification Search
CPC ......... C08G 63/19; C08G 63/20; C08G 63/64
USPC .................................. 528/176, 179, 296, 298
See application file for complete search history.

(56) References Cited

U.S. PATENT DOCUMENTS

2008/0221295 A1* 9/2008 Ishikawa ................ C08G 63/64
528/176

FOREIGN PATENT DOCUMENTS

| CN | 1918210 A | 2/2007 |
| JP | 4331050 B2 | 9/2009 |
| KR | 1020080078356 A | 8/2008 |
| KR | 101139190 B1 | 4/2012 |
| KR | 101228221 B1 | 1/2013 |
| WO | 2012170263 A1 | 12/2012 |

* cited by examiner

*Primary Examiner* — Terressa Boykin
(74) *Attorney, Agent, or Firm* — Dentons US LLP

(57) ABSTRACT

Disclosed are polycarbonate having high fluidity through inclusion of an aliphatic polyhydric alcohol-substituted diphenol compound in a polycarbonate backbone and a method of preparing the same. The polycarbonate is polymerized by comprising a diphenol mixture and a carbonate precursor, the diphenol mixture comprising an aliphatic polyhydric alcohol-substituted diphenol compound according to Formula 1 and a bisphenol compound.

15 Claims, 2 Drawing Sheets

¹H NMR spectrum of HB PPG (Co-monomer) sample

¹H NMR spectrum of HB PPG-PC(Co-Pc) sample

POLYCARBONATE HAVING HIGH FLUIDITY AND METHOD OF PREPARING THE SAME

This application is a National Stage Entry of International Application No. PCT/KR2014/009229, filed Sep. 30, 2014, and claims the priority to and benefit of Korean Patent Application Nos. 10-2014-0131381, filed on Sep. 30, 2014 and 10-2013-0116329 filed Sep. 30, 2013, all of which are hereby incorporated by reference in their entirety for all purposes as if fully set forth herein.

TECHNICAL FIELD

The present invention relates to polycarbonate having high fluidity and a method of preparing the same. More particularly, the present invention relates to polycarbonate having high fluidity through inclusion of an aliphatic polyhydric alcohol-substituted diphenol compound in a polycarbonate backbone and a method of preparing the same.

BACKGROUND ART

Polycarbonate is known as a thermoplastic resin which is robust and transparent, and has high impact resistance. However, polycarbonate also has relatively high melt viscosity. Therefore, so as to prepare molded products using polycarbonate, relatively high extrusion temperature and molding temperature are required. Over the years, considerable effort has been made to maintain preferable physical characteristics while reducing melt viscosity of polycarbonate. With regard to this, a plasticizer is used, an aliphatic chain stopper is used, a molecular weight is reduced, or a blend of bisphenol having a long-chain aliphatic substituents and a variety of polycarbonate copolymers, and a blend of polycarbonate and other polymers are prepared.

With regard to use of plasticizers, plasticizers are generally used with a thermoplastic resin to achieve greater melt flowability. However, when a plasticizer is mixed with a polycarbonate composition, the plasticizer exhibits undesirable characteristics such as brittleness and changeability.

When an aliphatic chain stopper is used, flowability may be easily and properly obtained but impact resistance, which is measured using notched Izod, is considerably deteriorated. In addition, brittleness may be a problem.

When bisphenol having an aliphatic long-chain is used, increase of flowability may be observed. However, considerable reduction of desirable impact strength characteristics is generally associated therewith.

Therefore, there is a need to develop polycarbonate having high fluidity.

DISCLOSURE

Technical Problem

Therefore, the present invention has been made in view of the above problems, and it is one object of the present invention to provide a polycarbonate having high fluidity through inclusion of an aliphatic polyhydric alcohol-substituted diphenol compound in a polycarbonate backbone and a method of preparing the same.

Technical Solution

In accordance with one aspect of the present invention, provided is polycarbonate having high fluidity, which comprising a diphenol mixture and a carbonate precursor, the diphenol mixture comprising an aliphatic polyhydric alcohol-substituted diphenol compound represented by Formula 1 below and a bisphenol compound:

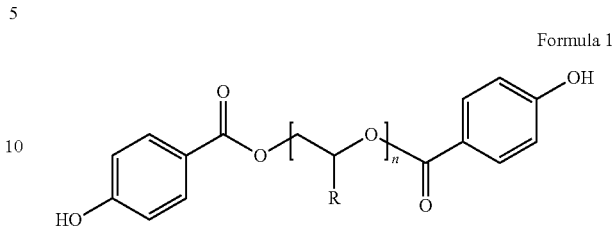

Formula 1 where R is hydrogen or a C1 to C4 alkyl group and n is an integer of 10 to 50.

In accordance with another aspect of the present invention, provided is a method of preparing polycarbonate having high fluidity, the method comprising: (1) mixing 0.05 to 1.0 wt % of an aliphatic polyhydric alcohol-substituted diphenol compound of Formula 1 below and 99.0 to 99.95 wt % of a bisphenol compound to prepare a diphenol mixture;

(2) dissolving the diphenol mixture in a basic medium and then adding an organic solvent to diphenol solution in which the diphenol mixture is dissolved, to obtain a reaction mixture; and (3) interfacial polymerizing by adding 1.0 to 1.2 mol of a carbonate precursor, based on 1 mol of the diphenol mixture, to the reaction mixture obtained from the dissolving:

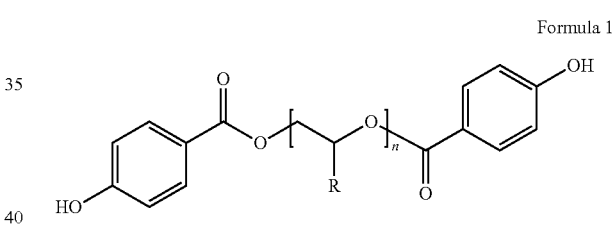

Formula 1 wherein R is hydrogen or a C1 to C4 alkyl group and n is an integer of 10 to 50.

Advantageous Effects

As apparent from the fore-going, the present invention advantageously provides polycarbonate having high fluidity by adding an aliphatic polyhydric alcohol-substituted diphenol compound to a polycarbonate backbone formed through polymerization of a bisphenol compound such as bisphenol A or the like and a carbonate precursor such as phosgene or the like such that an aliphatic polyhydric alcohol part is introduced to the polycarbonate backbone, in particular, between aromatic ring compounds.

BEST MODE

Figure 1:
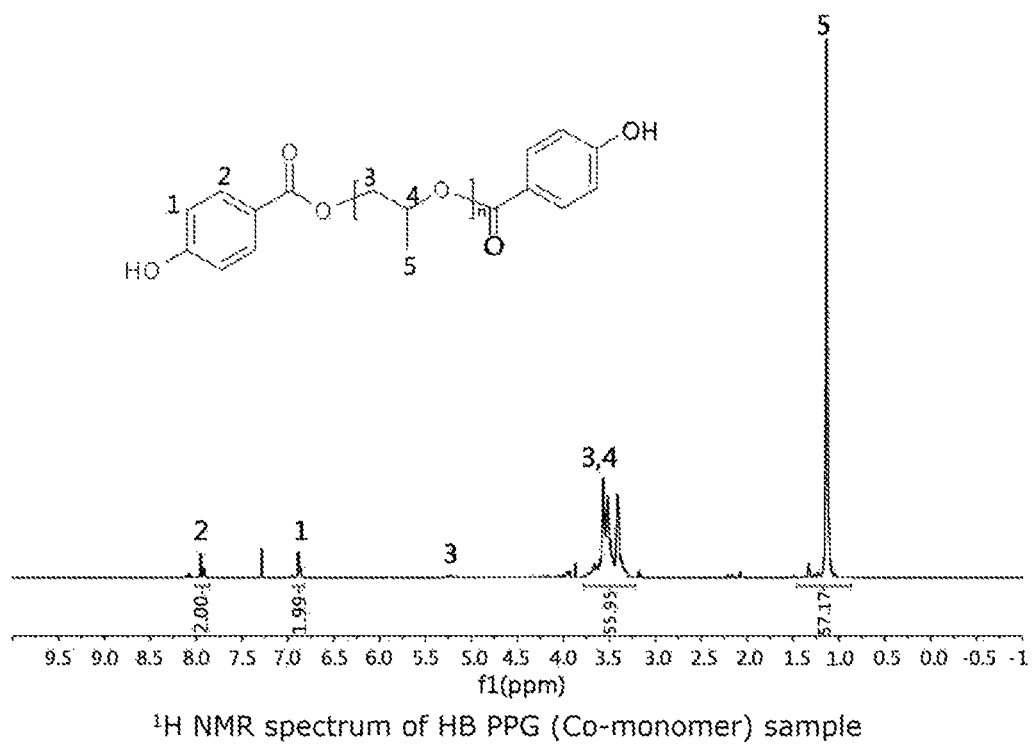
FIG. 1 illustrates a $^1$H NMR spectrum of hydroxybenzoate-PPG (HB PPG) prepared according to Example 1, as a comonomer.

Hereinafter, the present invention will be described in more detail.

Polycarbonate having high fluidity according to the present invention comprises a polymer polymerized from a diphenol mixture and a carbonate precursor, the diphenol mixture comprising an aliphatic polyhydric alcohol-substituted diphenol compound represented by Formula 1 below and a bisphenol compound:

Formula 1

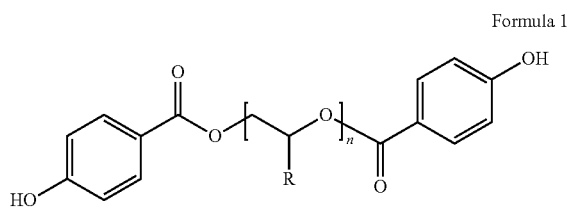

wherein R is hydrogen or a C1 to C4 alkyl group and n is an integer of 10 to 50.

In accordance with a specific embodiment of the present invention, as the aliphatic polyhydric alcohol-substituted diphenol compound of Formula 1, a polyethyleneglycol-substituted diphenol compound, in which R is hydrogen, or a polypropylene glycol-substituted diphenol compound, in which R is 1, is preferably used.

Polycarbonate obtained using the same has high fluidity.

In accordance with another embodiment of the present invention, as the aliphatic polyhydric alcohol-substituted diphenol compound of Formula 1, a compound (HO-phenyl-COO-PPG-OOC-phenyl-OH, wherein PPG is polypropylene glycol), in which 4-hydroxybenxoic acid and polypropylene are ester bonds, may be used.

In the aliphatic polyhydric alcohol-substituted diphenol compound according to Formula 1, the number of repeat units of the aliphatic polyhydric alcohol, namely, n, is 10 to 50, preferably 20 to 50, more preferably 30 to 45. Polycarbonate obtained using the same has high fluidity.

The polycarbonate having high fluidity according to the present invention comprises 1.0 to 1.2 mol, preferably 1.05 to 1.15 mol, more preferably 1.08 to 1.12 mol of a carbonate precursor, based on 1 mol of the diphenol mixture. In this regard, the diphenol mixture comprises 0.05 to 1.0 wt % of the aliphatic polyhydric alcohol-substituted diphenol compound represented by Formula 1 below and 99.0 to 99.95 wt % of the bisphenol compound as a remainder:

Formula 1

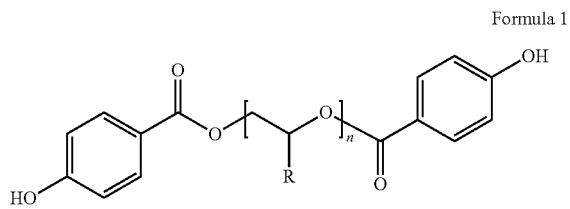

wherein R is hydrogen or a C1 to C4 alkyl group and n is an integer of 10 to 50.

The diphenol mixture comprises the aliphatic polyhydric alcohol-substituted diphenol compound represented by Formula 1 below in an amount of 0.1 to 0.8 wt %, preferably 0.2 to 0.5 wt %, more preferably 0.2 to 0.4 wt %, and the bisphenol compound, as a remainder, in an amount of 99.2 to 99.9 wt %, preferably 99.5 to 99.8 wt %, more preferably 99.6 to 99.8 wt %. Within this range, the polycarbonate obtained according to the present invention has high fluidity and preferable physical characteristics. That is, the polycarbonate is robust and transparent, and has high impact resistance.

The bisphenol compound may be at least one compound selected from the group consisting of bis(4-hydroxyphenyl) methane, bis(4-hydroxyphenyl)ether, bis(4-hydroxyphenyl) sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl) diphenylmethane, and ω,ω-bis[3-(o-hydroxyphenyl)propyl] polydimethylsiloxane. Thereamong, bisphenol A is preferable. However, the present invention is not limited thereto.

These bisphenol compounds used when polycarbonate is prepared may be commercially purchased from numerous domestic and foreign manufacturers and used by a person skilled in the art. Therefore, the bisphenol compounds may be understood as being publicly known.

The carbonate precursor may be at least one compound selected from the group consisting of phosgene, diphosgene, triphosgene, and bromophosgene, but the present invention is not limited thereto. These carbonate precursors are also used when polycarbonate is prepared and may be commercially purchased from lots of domestic and foreign manufacturers and used by a person skilled in the art. Therefore, the bisphenol compounds may be understood as being publicly known.

In one embodiment, the weight-average molecular weight of the polycarbonate having high fluidity according to the present invention may be 20,000 to 100,000 g/mol, 40,000 to 50,000 g/mol, or 45,000 to 49,000 g/mol. Within this range, the polycarbonate has excellent fluidity.

The polycarbonate having high fluidity according to the present invention has a notched impact strength of 700 to 900 J/m or 750 to 900 J/m and an MFR value of 15 to 30 or 17 to 28. Within this range, excellent property balance is exhibited.

A method of preparing polycarbonate having high fluidity according to the present invention comprises:

(1) mixing 0.05 to 1.0 wt % of an aliphatic polyhydric alcohol-substituted diphenol compound according to Formula 1 below and 99.0 to 99.95 wt % of a bisphenol compound to 9 DC 51228914.1 prepare a diphenol mixture;

(2) dissolving the diphenol mixture in a basic medium and then adding an organic solvent to a diphenol solution in which the diphenol mixture is dissolved, to obtain a reaction mixture; and (3) adding 1.2 mol of a carbonate precursor, based on 1 mol of the diphenol mixture, to the reaction mixture obtained by the dissolving and interfacial polymerizing, to obtain polycarbonate:

Formula 1

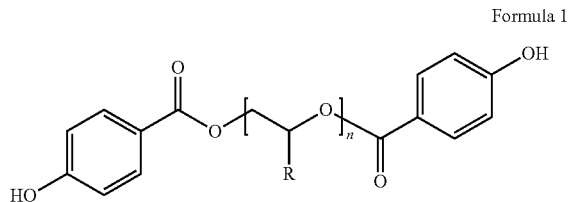

wherein R is hydrogen or a C1 to C4 alkyl group and n is an integer of 10 to 50.

After polymerization, a resin in an emulsion state may be isolated through centrifugation, precipitation, or the like, and may be purified. In addition, with respect to the polymerization, a polymerization catalyst may be, for example, triethylamine or a quaternary ammonium salt. In addition, a reaction stopper may be phenol or p-tert-butylphenol, but the present invention is not intended to be limited thereto.

In the dissolving, the basic medium may be an aqueous basic compound solution. By dissolving the diphenol compound in the aqueous basic compound solution, a hydroxyl group of the diphenol compound is deprotonated. Deprotonated oxygen of the diphenol compound reacts with the carbonate precursor through a carbonyl bond, resulting in formation of chloroformate. The formed chloroformate reacts with another diphenol compound, resulting in removal of generated chloride anions. In addition, the binding process of the carbonate is repeated and polycarbonate is formed.

The basic compound may be at least one selected from the group consisting of alkali metal compounds and alkali earth metal compounds. The alkali metal is preferably sodium hydroxide or potassium hydroxide.

In the basic compound, an equivalent ratio of the diphenol mixture to the basic compound is preferably 1:1.0 to 1.8 for efficient polymerization. Within this range, polymerization efficiency is improved.

The concentration of the basic compound in the basic medium is preferably 5 to 15 weight/volume %. Within this range, polymerization efficiency is improved. So long as specifically disclosed, the concentration unit, namely, weight/volume %, is defined as a unit representing a weight of a basic compound as a solute based on 100 of a total volume of a solution composed of the basic compound as the solute and preferably water as a solvent.

In the dissolving, the organic solvent is insoluble in water and inactive in polymerization. In addition, the organic solvent is an organic compound which may dissolve polycarbonate generated through polymerization. The organic solvent comprises chlorinated aliphatic hydrocarbons such as methylene chloride, tetrachloroethane, chloroform, 1,2-dichloroethylene, carbon tetrachloride, trichloroethane, dichloroethane, and the like; chlorinated aromatic hydrocarbons such as chlorobenzene, dichlorobenzene, chlorotoluene, and the like; acetophenone; cyclohexane; anisole; and a mixture thereof. Thereamong, methylene chloride is most preferable. As described above, by mixing the basic medium and the organic solvent, an interfacial polymerization reaction system is established.

The organic solvent is preferably used in an amount of 0.1 to 1 l based on 1 mol of the diphenyl mixture. Within this range, interfacial polymerization is efficiently performed and, thus, polymerization efficiency is improved.

The polymerization is performed by adding the carbonate precursor over the course of 10 to 120 minutes, preferably 10 to 100 minutes, more preferably 10 to 70 minutes. When the carbonate precursor is added within these time ranges, polymerization is constantly progressed and, as such, polymerization efficiency is improved.

The basic medium may further include at least one anti-coloring agent selected from the group consisting of sodium sulfate, sodium sulfite, and sodium borohydride.

Now, the present invention will be described in more detail with reference to the following examples. These examples are provided only for illustration of the present invention and should not be construed as limiting the scope and spirit of the present invention.

EXAMPLE

Example 1

Preparation of Comonomer 100 mL of methylene chloride, 6 g of 4-acetoxybenzoic acid, and 1 to 2 droplets of dimethylformamide (DMF) were added to a 250 mL flask 1-2. Subsequently, 2.92 mL of oxalyl chloride was added thereto and then reacted for 2 hours. After terminating the reaction, solvent was removed at reduced pressure. A resultant remaining material was dissolved in 100 mL of ethyl acetate (EA). Subsequently, 16.6 g of polypropylene glycol (PPG) and 6.9 mL of triethylamine (TEA) were dissolved in 50 mL of EA and then slowly added to a flask. Subsequently, the resultant mixture was reacted for 8 hours while being refluxed at 90° C. After terminating the reaction and further treating(work-up) with water and EA, an EA layer was washed using saturated sodium bicarbonate. Subsequently, water was removed from the EA layer using magnesium sulfate and then EA was removed by filtering and then reducing pressure. Subsequently, 150 mL of ethanol was added to a remaining material and cooled at 0° C. Subsequently, 0.94 mL of sodium methoxide methanol solution was slowly added thereto and reacted for 1 hour. After adding 10 mL of 1N-HCl thereto and further treating(work-up) with EA and water. Subsequently, water of an EA layer was removed using magnesium sulfate and EA was removed by filtering and then reducing pressure. A structure of an obtained comonomer, hydroxybenzoate-PPG(HB-PPG), was confirmed through $^1$H NMR (Varian 500 MHz) (See FIG. 1 below).

<Preparation of Copolycarbonate>

Figure 2:
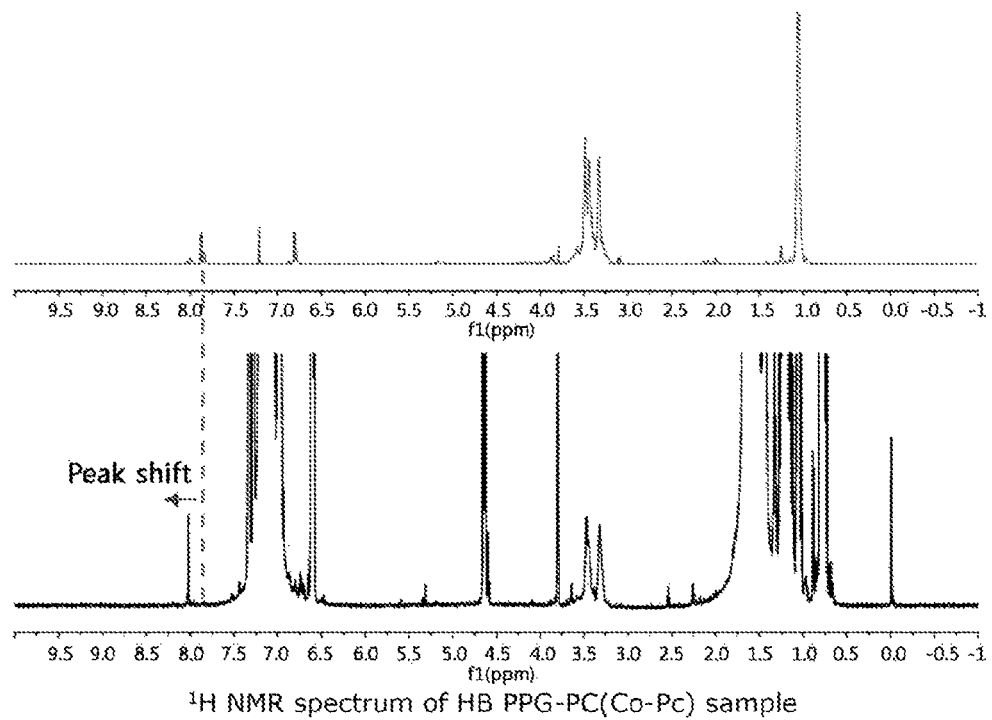
FIG. 2 illustrates hydroxybenzoate-PPG (HB PPG) prepared according to Example 1, as a comonomer and a $^1$H NMR spectrum of HB PPG-PC(Co-PC) as copolycarbonate polymerized therefrom, sequentially from the top. Preparation of copolycarbonate may be confirmed through peak shift exhibited when HB-PPG is copolymerized.

140 g of NaOH, and 232 g of bisphenol A (BPA) were added to a polymerization reactor, and mixed and dissolved under a nitrogen atmosphere. 4.60 g of para-tert-butylphenol (PTBP) and 0.116 g of previously prepared PPG-HB, dissolved in methylene chloride (MC), were added thereto. Subsequently, 128 g of triphosgene (TPG) dissolved in MC was added thereto and reacted for 1 hour while maintaining pH to 11 or more. After 10 minutes, 46 g of triethylamine (TEA) was added thereto and coupling reaction was performed. After 1 hour and 20 minutes, pH was lowered to 4, TEA was removed, and a washing process was carried out using distilled water three times. pH of a resultant polymer was adjusted to 6 to 7. A resultant polymer was re-precipitated in a mixture of methanol and hexane and dried at 120° C., resulting in production of a final copolycarbonate resin. A structure of the final copolycarbonate resin was confirmed through $^1$H NMR (Varian 500 MHz) (See FIG. 2 below).

<Preparation of Injection Specimen>

0.05 parts by weight of tris(2,4-di-tert-butylphenyl)phosphite, 0.01 parts by weight of octadecyl-3-(3,5-di-tert-butyl-4-hydroxyphenyl)propionate, and 0.03 parts by weight of pentaerythritol tetrastearate were added to the prepared copolycarbonate resin and were pelletized using a vent-attached HAAK Mini CTW. Subsequently, a specimen was prepared by injection molding using a HAAK Minijet injection molding machine at a cylinder temperature of 300° C. and a mold temperature of 120° C.

Example 2

Copolycarbonate and an injection specimen thereof were prepared in the same manner as in Example 1, except that 0.232 g (0.10 wt %) of a comonomer and 231.7 g (99.90 wt %) of bisphenol A were used.

Example 3

Copolycarbonate and an injection specimen thereof were prepared in the same manner as in Example 1, except that 0.464 g (0.20 wt %) of a comonomer and 231.5 g (99.80 wt %) of bisphenol A were used.

Example 4

Copolycarbonate and an injection specimen thereof were prepared in the same manner as in Example 1, except that 0.696 g (0.30 wt %) of a comonomer and 231.3 g (99.70 wt %) of bisphenol A were used.

Example 5

Copolycarbonate and an injection specimen thereof were prepared in the same manner as in Example 1, except that 0.928 g (0.40 wt %) of a comonomer and 231 g (99.60 wt %) of bisphenol A were used.

Example 6

Copolycarbonate and an injection specimen thereof were prepared in the same manner as in Example 1, except that 1.16 g (0.50 wt %) of a comonomer and 230.8 g (99.50 wt %) of bisphenol A were used.

Example 7

Copolycarbonate and an injection specimen thereof were prepared in the same manner as in Example 1, except that 2.32 g (1.00 wt %) of a comonomer and 229.7 g (99.00 wt %) of bisphenol A were used.

Comparative Example 1

Polycarbonate and an injection specimen thereof were prepared in the same manner as in Example 1, except that a comonomer was not used and 3.30 g of para-tert-butylphenol (PTBP) was used.

Comparative Example 2

Polycarbonate and an injection specimen thereof were prepared in the same manner as in Example 1, except that a comonomer was not used.

Comparative Example 3

Polycarbonate and an injection specimen thereof were prepared in the same manner as in Example 1, except that a comonomer was not used and 5.10 g of para-tert-butylphenol (PTBP) was used.

Comparative Example 4

Polycarbonate and an injection specimen thereof were prepared in the same manner as in Example 1, except that a comonomer was not used and 5.4 g of para-tert-butylphenol (PTBP) was used.

Comparative Example 5

Polycarbonate and an injection specimen thereof were prepared in the same manner as in Example 1, except that a comonomer was not used and 6.5 g of para-tert-butylphenol (PTBP) was used.

Reference Example 1

Copolycarbonate and an injection specimen thereof were prepared in the same manner as in Example 1, except that 4.64 g (2.00 wt %) of a comonomer and 227.3 g (98.00 wt %) of bisphenol A were used.

Reference Example 2

Copolycarbonate and an injection specimen thereof were prepared in the same manner as in Example 1, except that 6.96 g (3.00 wt %) of a comonomer and 225.0 g (97.00 wt %) of bisphenol A were used.

Test Example

Characteristics of polycarbonate resin specimens prepared according to Examples 1 to 7, Comparative Examples to 5, and Reference Examples 1 and 2 were measured according to methods below. Results are summarized in Table 1 below.

Weight-average molecular weight: measured in accordance with a GPC (Agilent 1200 series) method using PC Standard.

Impact strength (J/m): determined at 23° C. in accordance with ASTM D256 (⅛ inch, Notched Izod).

MFR: measured in accordance with ASTM D1238 (under a conditions of 300° C. and 1.2 kg).

TABLE 1

| Classification | HB-PPG content | Molecular weight (g/mol) | Notched Izod Impact (J/m) | MFR |
|---|---|---|---|---|
| Example 1 | 0.05 | 48,200 | 870 | 12 |
| Example 2 | 0.10 | 48,500 | 875 | 15 |
| Example 3 | 0.20 | 48,200 | 870 | 17 |
| Example 4 | 0.30 | 48,300 | 865 | 21 |
| Example 5 | 0.40 | 48,600 | 770 | 24 |
| Example 6 | 0.50 | 48,100 | 710 | 28 |
| Example 7 | 1.00 | 48,300 | 590 | 35 |
| Comparative Example 1 | X | 68,300 | 910 | 3 |
| Comparative Example 2 | X | 48,500 | 860 | 10 |
| Comparative Example 3 | X | 43,000 | 780 | 15 |
| Comparative Example 4 | X | 40,400 | 680 | 22 |
| Comparative Example 5 | X | 37,500 | 530 | 30 |
| Reference Example 1 | 2.00 | 47,900 | 380 | 41 |
| Reference Example 2 | 3.00 | 48,000 | 260 | 43 |

As shown in Table 1, it can be confirmed that the copolycarbonate resins (Examples 1 to 7) according to the present invention exhibit excellent fluidity and impact strength, when compared with the polycarbonate resins according to Reference Examples 1 and 2, which do not include HB-PPG, and Comparative Examples 1 to 5, which include a large amount, namely, 2.00 wt % or more, of HB-PPG. In particular, it can be confirmed that Example 3 to 5 including 0.20 to 0.40 wt % of HB-PPG exhibit excellent fluidity and impact strength.

What is claimed is:

1. Polycarbonate polymerized by comprising 1.0 to 1.2 mol of a carbonate precursor based on 1 mol of a diphenol mixture, the diphenol mixture comprising 0.05 to 0.8 wt % of an aliphatic polyhydric alcohol-substituted diphenol compound represented by Formula 1 below and 99.2 to 99.95 wt % of a bisphenol compound:

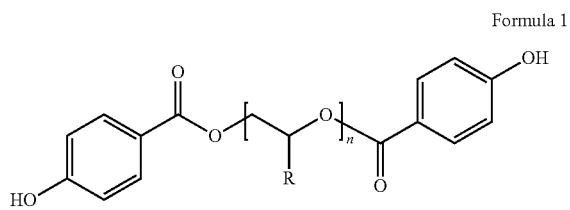

Formula 1 wherein R is hydrogen or a C1 to C4 alkyl group, and n is an integer of 10 to 50.

2. The polycarbonate according to claim 1, wherein the bisphenol compound is at least one compound selected from the group consisting of bis(4-hydroxyphenyl )methane, bis (4-hydroxyphenyl)ether, bis(4-hydroxyphenyl)sulfone, bis (4-hydroxyphenyl )sulfoxide, bis(4-hydroxyphenyl)sulfide, bis(4-hydroxyphenyl)ketone, 1,1-bis(4-hydroxyphenyl) ethane, 2,2-bis(4-hydroxyphenyl)propane (bisphenol A ; BPA), 2,2-bis(4-hydroxyphenyl )butane, 1,1-bis(4-hydroxyphenyl)cyclohexane (bisphenol Z ; BPZ), 2,2-bis(4-hydroxy -3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis (4-hydroxy-3-methylphenyl)propane, 2,2-bis(4-hydroxy-3,5-dimethylphenyl)propane, 1,1-bis (4-hydroxyphenyl)-1-phenylethane, bis(4-hydroxyphenyl) diphenylmethane, and α,ω-bis[3-(o-hydroxyphenyl )propyl] polydimethylsiloxane.

3. The polycarbonate according to claim 1, wherein the carbonate precursor is at least one compound selected from the group consisting of phosgene, diphosgene, triphosgene, and bromophosgene.

4. The polycarbonate according to claim 1, wherein a weight-average molecular weight of the polycarbonate is 20,000 to 100,000 g/mol.

5. The polycarbonate according to claim 1, wherein the polycarbonate has a notched impact strength of 700 to 900 J/m and an MFR value of 15 to 30.

6. A method of preparing polycarbonate, the method comprising:
mixing 0.05 to 0.8 wt% of an aliphatic polyhydric alcohol-substituted diphenol compound of Formula 1 below and 99.2 to 99.95 wt% of a bisphenol compound to prepare a diphenol mixture;
dissolving the diphenol mixture in a basic medium and then adding an organic solvent to a diphenol solution, in which the diphenol mixture is dissolved, to obtain a reaction mixture; and
interfacial polymerizing by adding 1.0 to 1.2 mol of a carbonate precursor, based on 1mol of the diphenol mixture, to the reaction mixture obtained through the dissolving, to obtain polycarbonate:

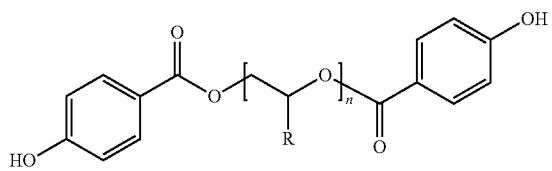

Formula 1 wherein R is hydrogen or a C1 to C4 alkyl group, and n is an integer of 10 to 50.

7. The method according to claim 6, wherein, in the dissolving, the basic medium is an aqueous basic compound solution.

8. The method according to claim 7, wherein the basic compound is at least one selected from the group consisting of alkali metal compounds or alkali earth metal compounds.

9. The method according to claim 8, wherein the alkali metal is sodium hydroxide or potassium hydroxide.

10. The method according to claim 7, wherein an equivalent ratio of the diphenol mixture to the basic compound in the basic compound is 1:1.0 to 1.8.

11. The method according to claim 7, wherein concentration of a basic compound of the basic medium is 5 to 15 weight/volume%.

12. The method according to claim 6, wherein the organic solvent in the dissolving is at least one selected from the group consisting of methylene chloride, tetrachloroethane, chloroform, 1,2-dichloroethylene, carbon tetrachloride, trichloroethane, dichloroethane, chlorobenzene, dichlorobenzene, chlorotoluene, acetophenone, cyclohexane, anisole, and mixture thereof.

13. The method according to claim 12, wherein the organic solvent is used in an amount of 0.1 to 1 l based on 1 mol of the diphenyl mixture.

14. The method according to claim 6, wherein the interfacial polymerizing is performed by adding the carbonate precursor over a period of 10 to 120 minutes.

15. The method according to claim 6, wherein the basic medium further comprises at least one anti-coloring agent selected from the group consisting of sodium sulfate, sodium sulfite, and sodium borohydride.

* * * * *